United States Patent
Verdin

[11] 3,754,653
[45] Aug. 28, 1973

[54] APPARATUS AND METHOD FOR COLLECTION OF OIL FROM SURFACE OF THE SEA

[76] Inventor: Sam M. Verdin, 2600 Breton Dr., Marrero, La. 70072

[22] Filed: Apr. 21, 1971

[21] Appl. No.: 136,147

Related U.S. Application Data

[63] Continuation-in-part of Ser. No. 46,963, June 17, 1970, abandoned.

[52] U.S. Cl............ 210/197, 210/DIG. 21, 210/242
[51] Int. Cl...................... B01d 21/00, E02b 15/04
[58] Field of Search .................... 37/54, 55; 210/83, 210/242, DIG. 21

[56] References Cited
UNITED STATES PATENTS

| | | | |
|---|---|---|---|
| 3,630,376 | 12/1971 | Price | 210/242 |
| 3,237,774 | 3/1966 | Schuback | 210/DIG. 21 |
| 3,615,017 | 10/1971 | Valdespino | 210/242 |
| 3,259,245 | 7/1966 | Earle | 210/242 X |
| 3,523,611 | 8/1970 | Fitzgerald | 210/242 |
| 1,591,024 | 7/1926 | Dodge | 210/DIG. 21 |

Primary Examiner—Samih N. Zaharna
Assistant Examiner—T. A. Granger
Attorney—Cushman, Darby & Cushman

[57] ABSTRACT

An oil spill on the surface of the sea is collected by means of a funnel-like scoop which is moved horizontally through the water in a direction such that oil and sea water, including waves, flow into the open end of the scoop. An oil-rich mixture flows over a weir located at the apex end of the scoop and the water is returned to the sea after separation of the oil. The trim of the scoop is adjusted by ballast tanks.

6 Claims, 7 Drawing Figures

Patented Aug. 28, 1973
3,754,653
2 Sheets-Sheet 1
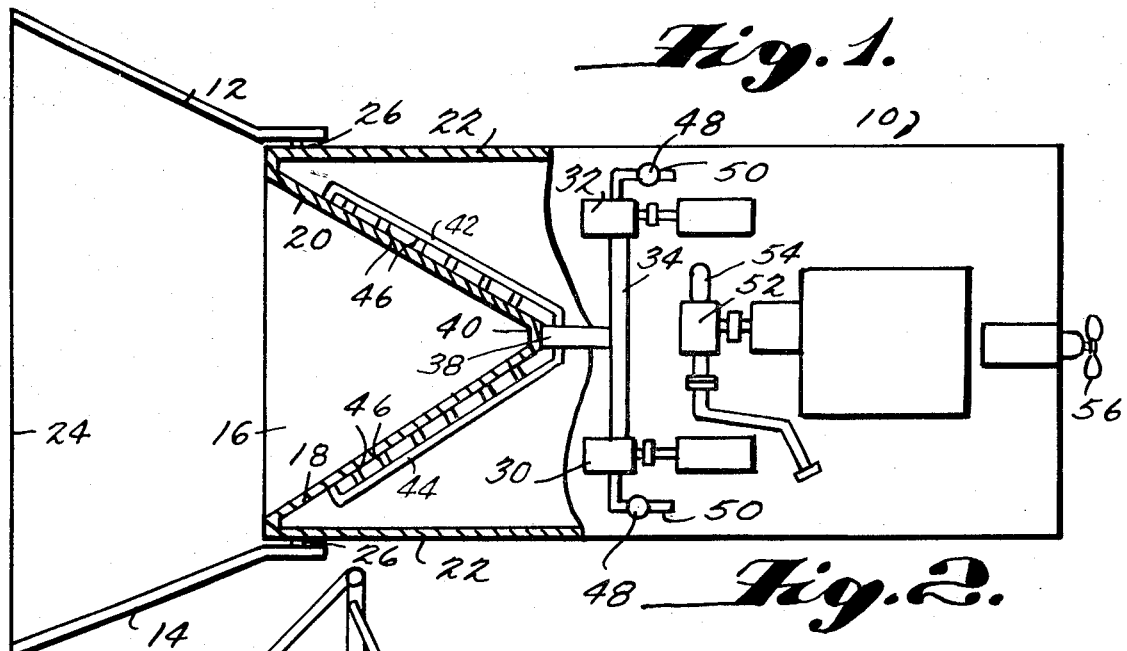
Fig. 1.
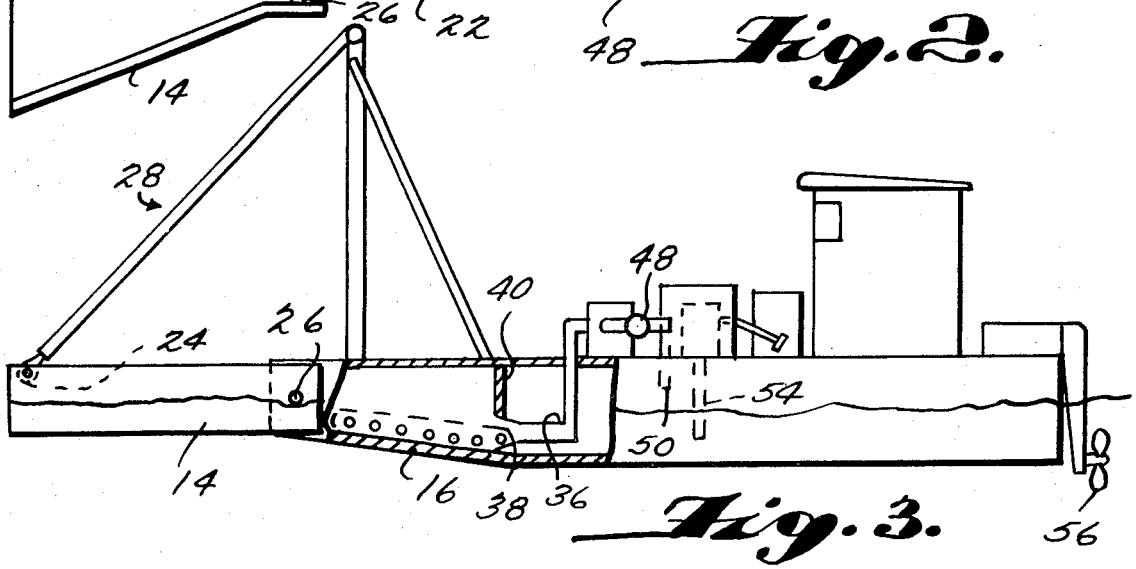
Fig. 2.
Fig. 3.
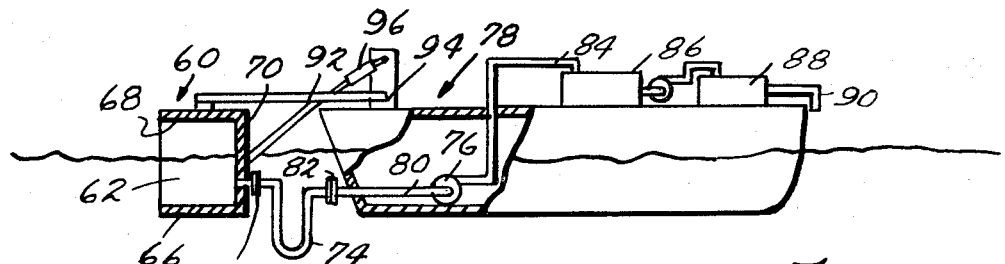
Fig. 4.
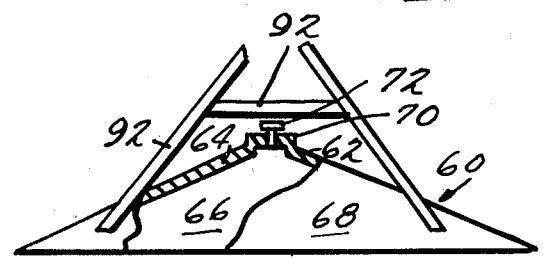
INVENTOR
SAM M. VERDIN
BY Cushman, Darby & Cushman
ATTORNEYS

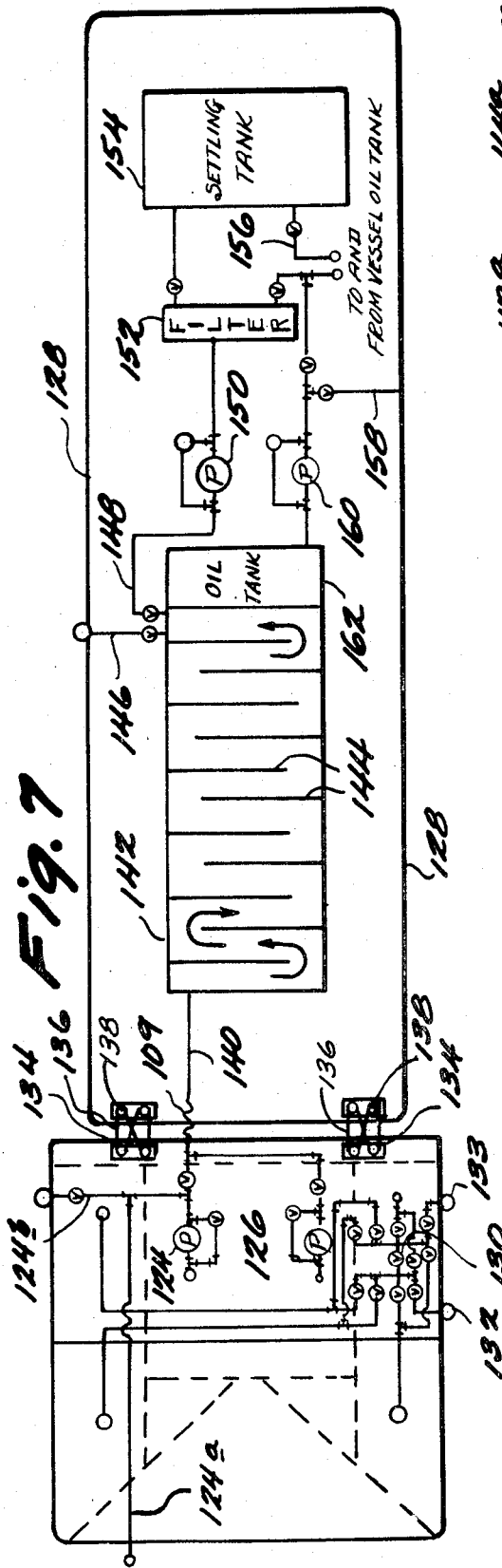
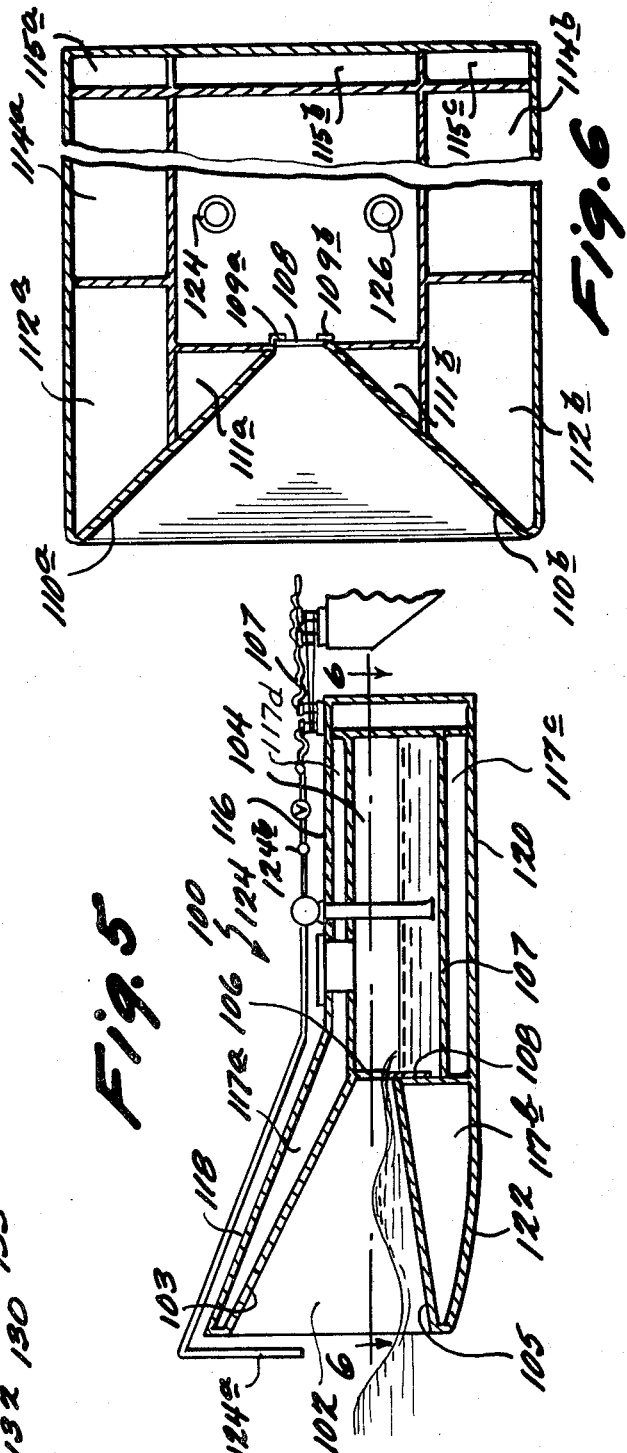

APPARATUS AND METHOD FOR COLLECTION OF OIL FROM SURFACE OF THE SEA

This is a continuation-in-part of application Ser. No. 46,963, filed June 17, 1970, now abandoned.

This invention relates to apparatus for collecting oil well spills or oil storage spills from the surface of the sea and in particular to a funnel-like scoop adapted to be moved through the water to thereby guide water and oil toward a suction inlet located at the apex end of the scoop.

In the past it has been the practice to remove relatively small amounts of oil from the surface of relatively quiescent bodies of water such as harbors by means of a floating skimmer structure which includes an intake pan or the like for the purpose of skimming only the floating oil layer from the underlying body of water. Such prior art skimmers are unsuitable for collecting large amounts of oil from the surface of rough water, such as the surface of the sea or the Gulf of Mexico, because the frequency characteristics of the skimmer and the size and shape of the skimmer inlet are incompatible with waves.

According to the principles of the present invention oil is removed from the surface of the water in the presence of waves by mechanically scooping in large quantities of the oil-contaminated surface water including much of the waves themselves and subsequently and continuously separating the oil from the water. In one embodiment the incoming water and oil are guided directly to the suction inlet of one or more pumps which pump the mixture to a separation tank. In the preferred embodiment an oil-rich phase passes over a weir or the like into a storage compartment from which it is pumped to a separation tank. The correct elevation of the scoop structure relative to the sea is maintained by means of ballast tanks.

The scoop employed in the present invention to scoop in the water and oil is somewhat analogous to a horizontally-disposed funnel in that it has horizontally spaced-apart converging side walls which guide the incoming mixture inwardly toward an opening at the apex end of the scoop. In use the scoop is disposed in the sea with the side walls extending down into the water and projecting above the surface of the water, the height of the side walls being sufficient to encompass the highest waves normally encountered. The scoop is then moved forwardly through the water to cause oil and water to flow into the scoop and then through the apex opening which, in the preferred embodiment, includes a weir. The oil layer and a minor portion of the underlying water flow over the weir into a compartment from which they are pumped to a separating system.

The invention will be further understood from the following detailed description of three illustrative embodiments taken with the drawing in which:

FIG. 1 is a plan view, partly broken away, of a water-oil scoop incorporated in a specially constructed barge;

FIG. 2 is a side elevational view, partly broken away, of the barge of FIG. 1;

FIG. 3 is a side elevational view of a water-oil scoop constructed as a separate unit and suspended from a floating vessel;

FIG. 4 is a top view of the scoop of FIG. 3;

FIG. 5 is a longitudinal vertical sectional view of another embodiment of the scoop.

FIG. 6 is a sectional view taken on the line 6—6 of FIG. 5; and

FIG. 7 is a plan view of the scoop shown in FIGS. 5 and 6 as connected to a barge.

Referring to FIGS. 1 and 2 there is shown a water-oil scoop structure defined in part by a special open-front barge 10 and in part by a pair of rearwardly converging guides 12 and 14 carried at the bow for guiding water and oil into the open bow when the barge 10 moves forwardly through the water. The specially constructed bow portion of the barge 10 includes a downwardly and rearwardly inclined bottom wall 16 and two converging inner walls 18 and 20 which together define a large V-shaped opening which faces forwardly. The outer ends of the inner walls 18 and 20 are connected to barge side walls 22 so as to define a water-tight hull which may be divided into separate compartments if desired. The converging guides 12 and 14 are vertically disposed metal walls joined together near their forward ends by a rigid transverse member 24. The rear ends of the guides 12 and 14 are pivotally supported on the hull of the barge 10 as at 26 for movement about a horizontal axis. The forward ends of the guides 12 and 14 are suspended by a conventional cable and pulley arrangement 28 so that the elevation of the opening defined between the guides can be adjusted.

The suction equipment in the embodiment illustrated in FIGS. 1 and 2 includes two motor-driven suction pumps 30 and 32 the inlets of which are interconnected by a pipe 34 which in turn connects with a main inlet pipe 36. The forward end 38 of the main inlet pipe is flared and connects through a vertical end wall 40 with the apex end of the open bow just above the rear end of the bow bottom wall 16. Two manifold suction pipes 42 and 44 connect with the main inlet pipe 36 and extend forwardly behind the bow side walls 18 and 20 at an elevation just above the bow bottom wall 16. A plurality of suction inlets 46 are connected between the manifold pipes 40 and 42 and the bow opening.

The suction pumps 30 and 32 discharge through valves 48 and discharge lines 50 into the hull of the barge 10 where the water and oil are allowed to separate. The separated water may then be pumped from the hull by means of a motor-driven suction pump 52 having an inlet pipe 54 dipping into the lower portion of the hull.

In use the barge 10 is moved forwardly through the sea, as by means of a motor-driven propeller 56, into an area contaminated by an oil spill resulting from an uncapped oil well or a ruptured storage facility or tanker. Water and oil and turbulent water-oil mixtures, pass into the space between the guides 12 and 14 and are guided inwardly toward the open bow defined by the walls 16, 18, 20 and 40. As the turbulent liquids pass into the open bow without obstruction they are sucked into the inlets 46 and into the open end 38 of the pipe 36 by the action of the pumps 30 and 32. The mixed liquids pass through the discharge lines 48 and 50 into the hull where oil separates by gravity. It will be understood that the vertical dimension of the guides 12 and 14 is sufficiently great to accommodate the amplitude of normal sea waves and prevent loss of oil over or under their upper and lower edges, respectively. That is, the guides 12 and 14 extend deep enough into the sea and project high enough above the surface that all the oil-bearing water which passes into the space between the guides is guided inwardly and rearwardly.

FIGS. 3 and 4 illustrate an embodiment of the invention in which the scoop is a separate structure which does not require a special open bow construction. As shown, the scoop 60 is a unitary generally funnel-shaped unit formed of two rearwardly converting vertical side walls 62 and 64, a horizontal triangular bottom wall 66 and a horizontal triangular top wall 68. The apex end of the scoop 60 includes a box-like projection 70 which carries a coupling 72 for a flexible suction line 74 leading to the inlet of a suction pump 76. The pump 76 is located within the hull of a boat 78 in a position below the surface of the sea so as to assure automatic priming of the pump 76 when the scoop 60 is lowered to the illustrated position. The pump 76 may have a permanent inlet pipe 80 secured through the bow and fitted with a coupling 82 to allow removal of the flexible pipe 74.

The outlet of pump 76 is connected by a pipe 84 to a tank 86 carried by the boat. Water and oil passing into the tank 86 separate by gravity and the water which may still carry some dispersed oil is then pumped to a second tank 88. The tank 88 may include a mechanical separator (not shown) for separating the dispersed oil, and the water can then be returned to the sea through a pipe 90.

The scoop 60 is mounted in front of the bow by means of suitable framing which holds the scoop 60 against movement by waves and which permits vertical adjustment relative to the boat. As illustrated schematically the framing may include rigid interconnected frame members 92 forming an assembly which is rotatable about a horizontal transverse axle 94 supported on the deck. A hydraulic cylinder and piston unit 96 may be provided by swinging the assembly and the scoop 60 about the axle 94.

The scoop structure 100 of FIGS. 5, 6 and 7 includes a funnel-shaped inlet section 102 which communicates with a receiving compartment 104 through an opening 106 at the apex end of the inlet section 102. The section 102 is defined in part by a rearwardly and downwardly inclined top wall 103, a rearwardly and upwardly inclined bottom wall 105 and two rearwardly converging side walls 110a and 110b, all of which terminate at the location of the opening 106. A vertically adjustable weir plate 108, held in place by guides 109a and 109b, is disposed within the opening 106 adjacent the rear end of the bottom wall 105.

The receiving compartment 104 is defined in part by a horizontal bottom wall 107 which is disposed well below the level of the rear end of the inclined wall 105 so as to provide sufficient volume for receiving variable flow rates of water and oil from the weir 108. The sides of the compartment 104 are formed by double-walls which define forward ballast tanks 112a and 112b and rear ballast tanks 114a and 114b.

Spaces 111a and 111b between the inlet section 102 and receiving compartment 104 and the spaces 115a, 115b and 115c behind the compartment 104 can be used as cofferdams. Water-tight buoyancy compartments 117a, 117b, 117c and 117d are defined in part by top wall portions 116, 118 and bottom wall portions 120 and 122.

The scoop 100 also includes suction pumps 124 and 126 which have their intakes disposed within the receiving compartment 104. The intake of pump 124 is disposed close to the bottom of the compartment 104, and its outlet is connected either to a conduit 124a which discharges in front of the scoop inlet section 102 or to a conduit 124b which discharges to one side of the scoop. In operation the pump normally pumps only water which is discharged through the conduit 104b, but if oil is mixed with the water, the mixture will be pumped through the conduit 124a so as to re-enter the inlet 102. The intake of the pump 126 is disposed at a higher level in the compartment 104 and in operation the pump 126 transfers substantially all oil to a self-propelled barge 128, by a flexible conduit 109 shown in FIG. 7.

The scoop 100 also includes a ballast pumping system, shown schematically in FIG. 7, for controlling the amount of sea water in each of the ballast tanks 112a, 112b, 114a and 114b. The system includes a pump 130, a suction line 132 having a lower end open below sea level, a discharge line 133 and suitable piping and valving, all of which may be conventional in structure and operation to effect filling and emptying of the ballast tanks.

The scoop 100 is releasably secured to the barge 128 by any suitable means. As shown, cables 136 are lashed between posts 134 and 138 carried by the scoop 100 and barge 128, respectively.

While the actual dimensions of the scoop 100 are not critical, the height and width of the inlet section 102 must be sufficient to take in waves of substantial size. To this end the inlet section may be, for example, fifteen feet in height and thirty or more feet in width at its forward end. The width of the opening 106 may be, for example, three feet. The scoop should be of sufficient vertical dimension to permit the forward edge of the bottom wall 105 to lie about four feet below the surface, in spite of the fact that the depth of spilled oil on the surface of the sea does not usually exceed about 0.5 to 1.0 inches, even in the presence of waves.

The flexible conduit 109 is connected through a conduit 140 fixed to the deck of the barge 128 to a preliminary separation tank 142, shown with its top cover removed, in which the oily mixture follows a circuitous route past baffles 144 whereby stratification occurs between oil and water layers. At the downstream end of the tank 142 clear water is discharged overboard through a conduit 146 while the oil top layer is passed by a conduit 148 and pump 150 to a filter 152 which removes solid impurities from the water-oil mixture. The mixture finally passes from the filter into a settling tank 154. The oil separated in tank 154 passes by a conduit 156 to an oil tank (not shown) located beneath the barge's upper deck. If the oil tank is already full, oil may be passed to another vessel via conduit 158 or pumped by oil pump 160 to an oil storage tank 162 which is also located on the barge's deck. Likewise, the overflow oil from the oil tank may be recycled to the filter 152. If the oil being skimmed is diesel oil, it may be employed as fuel for the barge engines.

The barge 128 is also provided with fore and aft ballast tanks (not shown) and with a ballast control system (not shown) similar to the control system provided on the scoop 100.

The scoop 100 described above operates in the following manner. The trim of the scoop is first adjusted by use of the pump 130 and the valving and conduits shown in FIG. 7 so that the dead water line lies just above the point where the bottom wall 105 joins the opening 106. When sea waves enter the scoop section 102 they lose energy in friction against the walls 103, 105 and 110a and 110b so that the water reaching the opening 106 is comparatively quiet. In addition, the oil layer on the water will increase in thickness. The weir 108 is then adjusted to skim off the oil layer and the underlying portion of water, and thus only an oil rich mixture of oil and sea water passes to the receiving compartment 104.

The pumps 124 and 126 must be utilized to keep the level of oil and water in the receiving compartment 104 below the level of the weir 108 so that gravity will cause flow over the weir. The pump 124 which has the lower intake is normally used only as a clean water pump to pump water overboard via conduit 124b. If oil is present in the water the pump 124 returns the mixture to the scoop inlet 102 via conduit 124a. The pump 126 is used as the oily water transfer pump. Of course, if the oil and water level in receiving compartment 104 drops sufficiently the pump 124 is also valved to conduct oily water to the flexible conduit 107 and thus to the barge 128.

It is noted that while the above description fully covers the preferred embodiment of the invention, reference must be made to the following claims to determine the full scope of the invention.

What is claimed is:

1. Apparatus for removing oil from the surface of a body of water which is subject to waves of substantial amplitude comprising scoop means having horizontally spaced-apart, upright side wall means disposed at an angle to each other so as to define a forward open end of enlarged horizontal dimension, and an open apex end of reduced horizontal dimension; the vertical dimension of said side wall means being of substantial magnitude so as to exceed the amplitude of normal waves and thereby prevent loss of oil in a lateral direction, and said scoop means having top and bottom walls which are also angularly disposed with respect to one another, said top and bottom walls being joined at their respective edges to said side wall means to prevent loss of oil in upwards or downward direction, a receiving compartment with an inlet end located on the opposite side of said open apex end from said scoop means and in fluid communication therewith for storing a quantity of oil and water passing through said open apex end, adjustable buoyancy means for supporting said scoop means forward open end at the surface of the body of water, an adjustable weir located at said inlet end of said receiving compartment and mounted for vertical movement with respect to said open apex end, and said receiving compartment for separating oil from water collected by said scoop means and communicated to said receiving compartment, and pumping means connected between said receiving compartment and said scoop means for pumping an oil and water mixture from said compartment to said scoop means so that the mixture will re-enter the open apex end of said scoop means so as to further skim off the oil layer.

2. Apparatus as in claim 1 wherein said adjustable bouyancy means comprises a plurality of water-tight tanks symmetrically disposed on either side of said receiving compartment and said scoop means and means for introducing water into said tanks or removing it therefrom whereby said scoop means may be tilted in any direction.

3. Apparatus as in claim 1 wherein said receiving compartment comprises at least one settling tank in which the oil and water are separated into layers by differences in their densities.

4. An apparatus for removing oil from the surface of a body of water subject to waves of substantial amplitude comprising:
   a. a hollow truncated scoop means having an inlet end of enlarged horizontal dimension for substantially entrapping an entire wave, and sidewalls converging toward an outlet end of said scoop means of reduced horizontal dimension for permitting the passage therethrough of an oil and water mixture, said scoop means preventing loss therefrom of oil on the surface of the water;
   b. compartment means located adjacent said outlet end of said scoop means and in fluid communication therewith for permitting a quantity of oil and water passing through said outlet end to enter and be stored within said compartment means;
   c. pumping means with an inlet end operatively connected to said compartment means and an outlet end within said scoop means for pumping an oil and water mixture from said compartment means to said scoop means so that the mixture will re-enter said outlet end of said scoop means; and
   d. adjustable weir means located between said outlet end of said scoop means and said compartment for skimming off a layer of oil from the surface of the water collected by said scoop means.

5. The apparatus in claim 4 further comprising:
   an adjustable buoyancy means for vertically maintaining said outlet end of said scoop means above the surface of the water.

6. The apparatus as defined in claim 4, wherein said pumping is comprised of a first pump having an inlet therefor close to the bottom of said compartment means and a second pump having an inlet therefor within said compartment means vertically higher than the inlet of the first pump, whereby the first and second pumps maintain the level of oil and water below the level of the adjustable wier means.

* * * * *